US 9,208,081 B1

(12) United States Patent
Dice et al.

(10) Patent No.: US 9,208,081 B1
(45) Date of Patent: Dec. 8, 2015

(54) CONCURRENT OBJECT MANAGEMENT

(75) Inventors: David Dice, Foxborough, MA (US); Nir N. Shavit, Cambridge, MA (US); Mark S. Moir, Windham, NH (US); Antonios Printezis, Burlington, MA (US)

(73) Assignee: Oracle America, Inc., Redwood City, CA (US)

( * ) Notice: Subject to any disclaimer, the term of this patent is extended or adjusted under 35 U.S.C. 154(b) by 1270 days.

(21) Appl. No.: 11/948,618

(22) Filed: Nov. 30, 2007

(51) Int. Cl.
*G06F 12/00* (2006.01)
*G06F 12/02* (2006.01)

(52) U.S. Cl.
CPC .................................. *G06F 12/0269* (2013.01)

(58) Field of Classification Search
CPC ........................ G06F 17/30348; G06F 12/0269
USPC ............................. 707/813, 818, 819, 999.206
See application file for complete search history.

(56) References Cited

U.S. PATENT DOCUMENTS

| | | | | |
|---|---|---|---|---|
| 4,775,932 A * | 10/1988 | Oxley et al. | ............................ | 1/1 |
| 5,873,104 A * | 2/1999 | Tremblay et al. | ............. | 707/206 |
| 5,873,105 A * | 2/1999 | Tremblay et al. | ............. | 1/1 |
| 6,199,075 B1 * | 3/2001 | Ungar et al. | ............................ | 1/1 |
| 6,279,012 B1 * | 8/2001 | Sexton et al. | ................. | 707/206 |
| 6,311,290 B1 * | 10/2001 | Hasbun et al. | .................... | 714/15 |
| 6,341,293 B1 * | 1/2002 | Hennessey | ..................... | 707/206 |
| 6,510,437 B1 * | 1/2003 | Bak et al. | ................... | 707/103 Y |
| 6,772,154 B1 * | 8/2004 | Daynes et al. | ......................... | 1/1 |
| 6,865,585 B1 * | 3/2005 | Dussud | ........................... | 707/206 |
| 2002/0178352 A1 * | 11/2002 | Lambino et al. | ................... | 713/2 |
| 2004/0064641 A1 * | 4/2004 | Kodama | ......................... | 711/114 |
| 2007/0118579 A1 * | 5/2007 | Hudson | ......................... | 707/206 |
| 2008/0086608 A1 * | 4/2008 | Kano | ............................ | 711/162 |
| 2008/0172538 A1 * | 7/2008 | Dice et al. | ...................... | 711/163 |
| 2008/0281886 A1 * | 11/2008 | Petrank et al. | ................. | 707/206 |

* cited by examiner

*Primary Examiner* — Grace Park
(74) *Attorney, Agent, or Firm* — Brooks Kushman, P.C.

(57) ABSTRACT

A processing thread obtains an initial status of a reference field associated with an object having data stored in memory. The reference field represents, at least in part, a status of current modification operations (e.g., a status of moving the object from one location in memory to another), if any, applied to the object. The processing thread applies a sequence of instructions to data retrieved from the object to produce computational results for storage in the object. Prior to storing the computational results in the object, the processing thread can confirm whether the reference field has changed since obtaining the initial status.

35 Claims, 11 Drawing Sheets

CONCURRENT OBJECT MANAGEMENT

BACKGROUND

Memory management relates to managing memory resources in a computer system. This management may include allocating memory used by programs running on the computer system as well as reclaiming memory that had been allocated to the programs but is no longer used by the programs. In many programming environments, memory allocated to a program is often allocated from a heap. A heap, as used herein, relates to an area of memory that may be used for dynamic memory allocation.

In some programming languages, management of the heap is the programmer's responsibility. This approach to memory management is often termed manual or explicit memory management. The complexity of manual memory management may lead to many common errors that may cause unexpected or erroneous program behavior and crashes. As a result, a large portion of developer time may be spent debugging and trying to correct such errors.

One common error that may occur when using manual memory management is space leaks. Space leaks occur when allocated memory is no longer referenced but is not released. For example, if a program only frees memory space for the first element of linked list, the remaining list elements may no longer be reachable by the program and consequently may neither be used nor recovered. If enough memory leakage occurs, the heap may become saturated with unreferenced and unusable memory.

Another common error results from using an address to reference memory that has already been manually released. Such "use-after-free errors" (sometimes referred to as "stale pointer errors") do not occur in systems that use automatic memory management.

An alternative approach to manual memory management is automatic memory management. Automatic memory management relates to a technique for managing memory that often includes provisions for automatically reclaiming memory that is "unreachable" by software (e.g., programs) running on a system. Automatic memory management may be implemented as a service that is part of a programming language (e.g., Java®) or an extension to the language.

Garbage collection is a form of automatic memory management that relates to automatically finding and reclaiming unreachable memory. Garbage collection is widely utilized by many modern object-oriented programming languages. Garbage collection prevents memory loss due to, for example, space leaks, by automatically reclaiming objects that are unreachable.

Garbage collection is often implemented in the form of a garbage collector. A garbage collector is responsible for, inter alia, reclaiming areas of memory that are considered to be unreachable. These areas are often said to be "dead" or "garbage" and are considered eligible for reclaiming by the garbage collector. Areas in memory that are reachable are often said to be "live". These areas may include memory that is allocated and actively used by the software. Live areas are not collected by the garbage collector.

It is also common for garbage collection to perform other types of memory management such as memory re-organization or "defragmentation". During normal operation, objects are dynamically created and deleted in the heap, eventually causing gaps of unused memory between objects, also known as fragmentation. Fragmentation can adversely affect memory system performance, especially where large chunks of data have to be stored across several gaps of unused memory in the heap. During memory re-organization, a garbage collector compacts objects that are located throughout the heap into a substantially contiguous section of memory. This object compaction (e.g., defragmentation) removes the fragmented gaps of unused memory and, consequently, creates larger portions of contiguous unused memory enabling increased memory system performance.

SUMMARY

Conventional garbage collection techniques suffer from a number of drawbacks. In particular, one such drawback occurs when a garbage collection process copies objects in memory (e.g., heap) to contiguous memory space and compacts the heap. This compacting of the heap tends to "defragmentize" the memory and provides larger contiguous portions of unused data. However, during such processing, and particularly in a multi-process environment, execution of a conventional garbage collection process may cause temporary suspension of all processing threads that currently access the memory. This technique has been referred to as a "stop the world" effect resulting in halting of all processing threads. By temporarily terminating each processing thread, the associated computing system suffers a significant performance penalty. Such a performance penalty can especially effect time-critical, real-time applications such as on-line stock trading applications because no processing progress is made during the halt period.

Certain example embodiments disclosed herein overcome such drawbacks, as well as other drawbacks in the art. For example, embodiments disclosed herein provide for the concurrent copying of objects in memory (e.g., defragmentation) by a garbage collection process and execution of processing threads that access the same memory (e.g., heap). In providing such operational concurrency, the garbage collection process does not have to temporarily suspend all processing threads accessing memory as a result of moving an object from one location to another. Instead, only processing threads accessing a respective object being moved are candidates for suspension. As a result, the system associated with the processing threads can perform more seamlessly and operate at higher levels of efficiency.

Embodiments herein can include distinct application processing threads (commonly referred to as "mutator threads") and garbage collection threads. In one embodiment, the application processing threads and garbage collection threads can each have a distinct and fixed role during execution. According to other embodiments, the threads can have roles that vary between mutator processing and garbage collection activity. In other words, a mutator thread can perform garbage collection operations in certain scenarios.

In an example embodiment, each of multiple objects in memory has an associated reference field indicating whether a garbage collection process is moving the object from one location in memory to another. A processing thread, which performs operations with respect to data in a given object, obtains an initial status of a reference field associated with the given object having data stored in memory. The reference field represents, at least in part, a status of current modification operations (e.g., a status of moving the object from one location in memory to another), if any, applied to the given object.

The processing thread applies a sequence of instructions to data retrieved from the object to produce computational results for storage in the given object. Prior to storing the computational results in the given object, the processing thread can conditionally store the computational results depending on whether a reference field has changed since obtaining the initial status. For example, if the processing thread detects that the object has been moved (based on a change in the reference field associated with the object) during execution of the instructions, the processing thread can abort and discard the computational results and re-execute the sequence of instructions.

It should be noted that reference fields as described herein can be (or can exhibit similar functionality and/or behavior as) "Brooks-type forwarding pointers" which are described in more detail in "Trading Data Space for Reduced Time and Code Space in Real-Time Garbage Collection on Stock Hardware", Rodney A. Brooks, Proceedings of the ACM Symposium on Lisp and Functional Programming, Austin, Tex., August 1984, pp. 256-262.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

In addition, other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Implementations herein may include ROCK Processor hardware developed by Sun Microsystems. Details of such technology are discussed in co-pending U.S. patent application Ser. Nos. 11/475,262, 11/475,604, 11/475,716, 11/475,814, 11/488,618, and 11/699,802, each entitled "METHODS AND APPARATUS TO IMPLEMENT PARALLEL TRANSACTIONS", each of which is incorporated herein by this reference.

It is to be understood that the system disclosed herein may be embodied strictly as a software program, as software and hardware, or as hardware alone. The embodiments disclosed herein, may be employed in computerized devices and software systems for devices such as those manufactured by Sun Microsystems, Inc. of Santa Clara, Calif.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
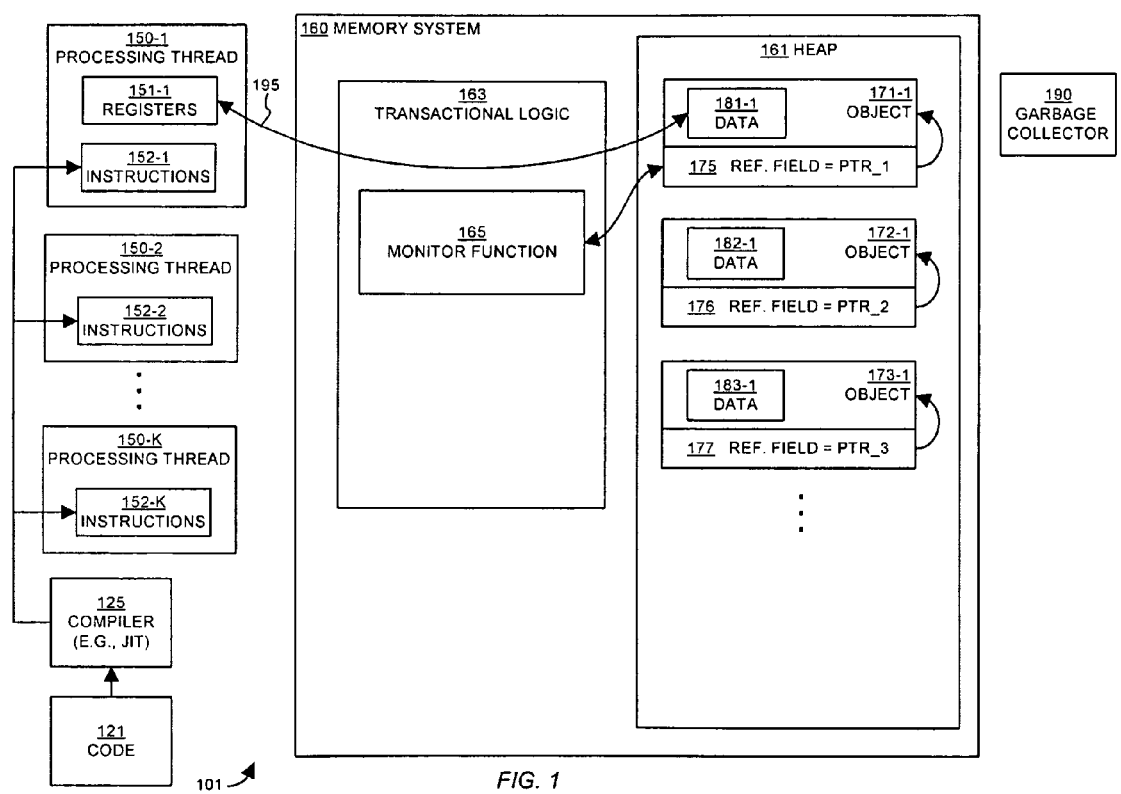
FIGS. 1-3 is an example block diagram of a memory system including transactional logic and a garbage collector according to embodiments herein.

Embodiments disclosed herein provide for the concurrent operations of copying objects in memory (e.g., heap) by a garbage collector (e.g., garbage collection process) and execution of processing threads which access the same memory. By allowing concurrent execution between the garbage collector and the processing threads, the garbage collector does not have to temporarily suspend all processing threads accessing memory as a result of moving or copying an object from one location to another. Instead, only processing threads accessing a respective object being moved are candidates for suspension.

Hardware-Assisted Model

A hardware-assisted model according to embodiments herein enables a garbage collector and one or more processing threads to concurrently execute within the same memory space. The transactional memory hardware manages data versions and tracks conflicts transparently as the software performs ordinary read and write accesses.

Transactional memory is commonly utilized to facilitate concurrency of multi-thread applications within a shared memory space. Embodiments disclosed herein utilize transactional memory functionality to not only facilitate concurrency between the various processing threads (e.g., mutator threads) of a multi-thread application, but also between those processing threads and a garbage collector.

An example processor instruction labeled "Checkpoint" showing high-level operations performed by a processing thread is shown:

TABLE I

CHECKPOINT FailPath
   (i)       LD Obj->fwd, f // fetch reference field
   (ii)      test 'f' for BUSY encoding
              if BUSY
   (iii)     Abort transaction and restart at the CHECKPOINT instruction
   (iv)     LD f->Field_A, Register_A
   (v)      LD f->Field_B, Register_B
   (vi)     COMMIT
              . . .
   (vii)    use Register_A and Register_B
              . . .

Note that the example processor instruction of Table I includes functionality associated with transactional logic. For example, the transactional logic provides the "Checkpoint" instruction in Table I which places the processor (executing the processing thread) in a transactional mode similar to the "CHKPT" instruction provided by the ROCK Processor hardware and developed by Sun Microsystems. Nonetheless, other transaction memory interfaces and functionality are also suitable for implementation of embodiments described herein.

Persons skilled in the art will appreciate a variety of alternative actions to take when the BUSY state is detected. One possibility is to spin in a loop; when the reference field is changed from BUSY to a new reference, this loop will terminate because the transaction will abort.

Persons skilled in the art will recognize that in practice it is often desirable to delay for a short time before proceeding to the next step. These delays are omitted for clarity.

In the event that the hardware transaction fails for any reason, transfer branches to the specified FailPath label, where a number of alternatives are suitable such as, for a non-limiting example, branching back to the CHECKPOINT instruction for retrying, possibly after some delay, passing control to a contention manager, or passing control to an alternative mechanism. For the code example in Table 1 and others that follow, although not shown, these details should be considered as well.

Figure 2:
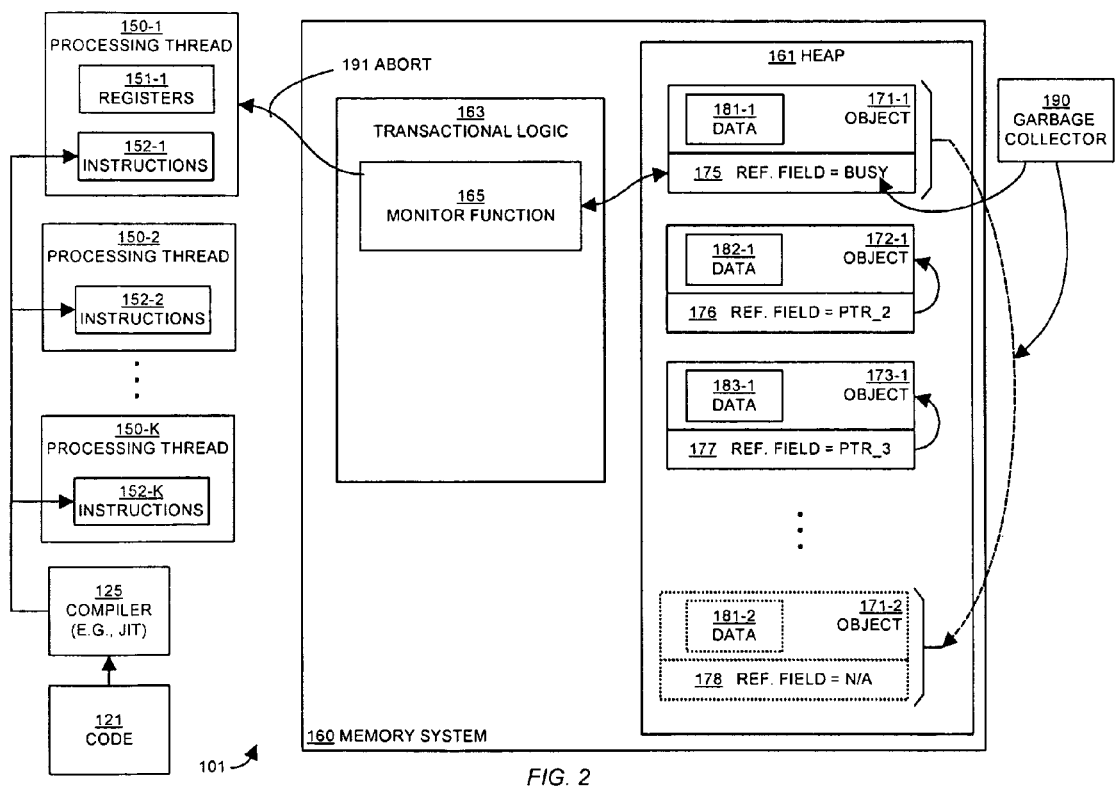
Figure 3:
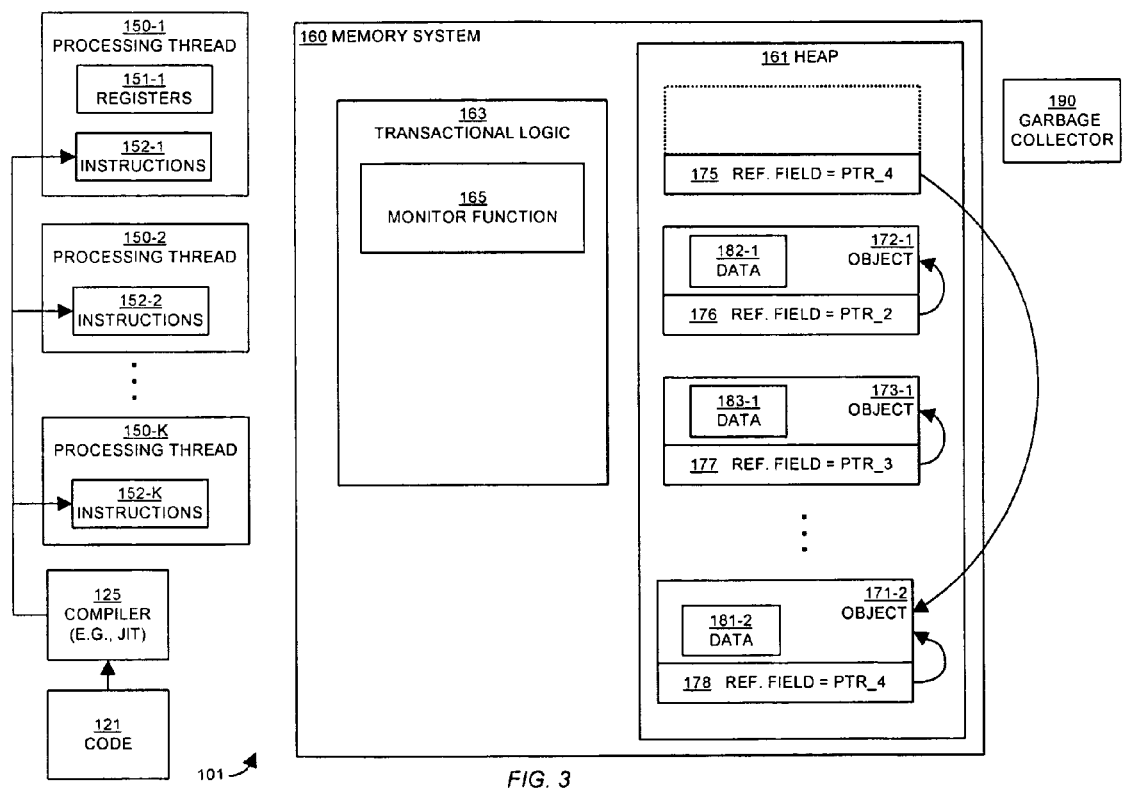

FIGS. 1-3 depict the implementation of the example instruction set of Table I in conjunction with the functionality of transactional hardware in greater detail, as discussed further below.

FIG. 1 is an example block diagram of a multi-processing environment 101 that illustrates interaction between processing threads 150 (e.g., processing threads 150-1, 150-2, . . . 150-K) and objects stored in memory (e.g., heap 161) according to embodiments herein. Note that the interaction (e.g., accessing, modifying, etc.) between processing thread 150-1 and data 181-1 associated with object 171-1 is represented by logical path 195 in FIG. 1.

In the example embodiment shown, multi-processing environment 101 includes code 121 (e.g., software encoding such as byte-code and/or source code, etc.), a compiler 125 (e.g., a JIT "Just-In Time" compiler such as one implemented by the JVM "Java Virtual Machine"), processing threads 150 (e.g., processing threads 150-1, 150-2, . . . 150-K), a memory system 160 including transactional logic 163 and a heap 161, and a garbage collector 190.

Prior to or during run-time, the compiler 125 translates the code 121 into native machine code (e.g., readable by a processor) such as instructions 152-1, 152-2, . . . 152-K for execution by respective processing threads 150-1, 150-2, . . . 150-K.

Note that this translation (by the compiler 125) can be done per-file, per-function or even on any arbitrary code fragment. Code 121 can also be compiled when it is about to be executed (hence the name "just-in-time").

In one embodiment, a resource such as compiler 125 breaks the code down into different segments that are executed in parallel via respective processing threads. The compiler or other resource can add "checkpoint" functionality to the segments of instructions as discussed herein so that the processing threads can be aborted when the objects currently accessed by a respective processing thread are processed by another entity such as garbage collector 190. A transaction can be chosen so that it does not experience unbounded persistent progress failure.

According to one implementation, when a transaction aborts, (i) control is transferred to the label in the associated Checkpoint instruction, (ii) register state is rolled back to the label associated in the Checkpoint instruction, and (iii) any transactional stores executed since the Checkpoint instruction are discarded. Execution of instructions 152-1 results in modifications to local values (e.g., as stored in registers 151-1) associated with the processing thread 150-1 (e.g., by performing such functions as load/fetch, store/write, increment, decrement, etc.).

Note that the example instruction set in Table I can be executed as the compiled instructions 152-1, 152-2, . . . or 152-K. The instruction set in Table I is represented as machine code in a human-readable format (e.g., assembly language) for clarity.

Heap 161 of memory system 160 includes multiple objects such as objects 171-1, 172-1, 173-1, . . . having associated data 181-1, 182-1, 183-1, . . . In addition, each object 171-1, 172-1, 173-1, . . . has an associated reference field 175-1, 176-1, 177-1, etc. The reference field can provide state (e.g., BUSY) and/or locational information (e.g., pointer to memory location). Although reference fields are maintained on a per-object basis, other embodiments herein include managing the reference fields on a per-memory-segment basis.

Note that in FIG. 1, each reference field 175-1, 176-1, 177-1 shows an arrow pointing to a location in memory where each respective object is stored, copied, or will be copied. As will be discussed later in this specification, the reference fields can be modified by the garbage collector 190 to indicate that the garbage collector (e.g., copying collector) is in a process of copying a respective object to a new location in the heap 161. The reference field also can be modified to identify a new location in memory (e.g., the heap 161) where the object has been copied.

For example, the reference fields 175-1, 176-1 and 177-1 in FIG. 1 each contain a pointer back to respective objects 171-1, 172-1 and 173-1 since those objects have not been moved or copied to a new location in the heap 161 by garbage collector 190. After the garbage collector 190 moves/copies an object to a new location in the heap 161 (e.g., to defragmentize the heap), the reference field points to the primary version (e.g., the newly moved/copied version) and assumes the role of forwarding pointer. In other words, the reference field (e.g., forwarding pointer) of the obsolete replica of the object will reference the current copy of the object. Mutator threads that access the obsolete replica of the object will thus be redirected to the current copy by the reference value (e.g., forwarding pointer).

As shown in FIG. 1, transactional logic 163 may include a monitor function 165.

The garbage collector 190 (e.g., garbage collection process) accesses and modifies objects in the heap 161 to perform such operations as memory management, memory re-organization (e.g., defragmentation), etc.

Still referring to FIG. 1, based on execution of the example instruction set of Table I, processing thread 150-1 interacts with (e.g., accesses, modifies, etc.) data 181-1 in object 171-1. However, in order to execute a segment of instructions 152-1 and proceed with accessing object 171-1, processing thread 150-1 and/or monitor function 165 checks a status of whether the object 171-1 is being moved or copied to another location in the heap 161 by a garbage collector such as garbage collector 190 before proceeding with execution of the instructions 152-1. This ensures that the processing thread 152-1 does not start executing a transaction that will interfere with an object currently in use (e.g., being moved) by the garbage collector 190.

To make the determination whether to proceed, processing thread 150-1 performs the following instructions (e.g., instructions 152-1) as noted in the example instruction set of Table I:

|  | CHECKPOINT FailPath |
|---|---|
| (i) | LD Obj->fwd, f // fetch reference field |
| (ii) | test 'f' for BUSY encoding |
|  | if BUSY |
| (iii) | Abort the transaction |
| (iv) | LD f->Field_A, Register _A |
| (v) | LD f->Field_B, Register _B |
| (vi) | COMMIT |

Via execution of instruction (ii) from Table I, the processing thread 150-1 determines whether reference field 175 (e.g., fwd) has been set to a busy state by garbage collector 190. When reference field 175 is set to a value indicating a busy state, this indicates that garbage collector 190 is copying object 171-1 to another memory location in heap 161.

During execution of instruction (iii), if the reference field associated with the object 171-1 equals a value representing "BUSY", the processing thread 150-1 aborts the transaction and retries Checkpoint at instruction (i) until the reference field 175 no longer indicates that the garbage collector 190 is copying the object 171-1 to a new location in the heap 161. In other words, the busy state of object 171-1 causes processing thread 150-1 to spin (e.g., after optional delay) until reference field 175 is not equal to a value representing "BUSY". Thus, processing thread 150-1 waits until garbage collector 190 has finished copying/moving object 171-1 to another memory location in heap 161 before resuming interaction with object 171-1.

After performing instructions to identify whether the garbage collector 190 is currently busy accessing the object 171-1, the processing thread performs additional processing instructions (e.g., example instructions (iv) and (v)) in which the processing thread 150-1 accesses the values in the object 171-1 (via variable 'f' which points to object 171-1) and performs local modification to retrieved data. For example, during execution of sample instructions (iv) and (v) from Table I, if reference field 175 does not equal a value representing "BUSY" (e.g., reference field 175 is a value pointing to a location of object 171-1), processing thread 150-1 proceeds by accessing data 181-1 in object 171-1. For example, assuming that object 171-1 has a Field_A and a Field_B (e.g., data 181-1) and registers 151-1 include a Register_A and a Register_B, processing thread 150-1 can load the value from Field_A into Register_A (instruction (iv)) and load the value from Field_B into Register_B (instruction (v)).

During execution of the instructions 152-1 and accessing object 171-1, the monitor function 165 associated with the transactional logic 163 monitors a state of reference field 175. When the garbage collector 190 moves the object 171-1 to a new location, the garbage collector changes the reference field 175 to a "BUSY" state. When monitor function 165 detects a change to the "BUSY" state, the monitor function 165 initiates suspension of processing thread 150-1 by performing abort step 191 as shown in FIG. 2. In such an instance, the processing thread 150-1 does not commit its results to memory but instead attempts re-execution of instructions 151-1 at a later time. Thus, when garbage collector 190 accesses the object 171-1, the processing thread 150-1 does not modify the object 171-1 at the end of executing instructions 151-1.

Throughout this document, "signal" may be interpreted as an "indication" according to embodiments herein and should not be confused with Unix signals or other common uses. Similarly, suspend in this context may be interpreted as "prevent from progressing to the next steps", specifically, prevent from completing a field access while a concurrent access (e.g., copying by the garbage collector thread) finishes.

As an alternative outcome, the garbage collector 190 may not modify the object 171-1 during execution of instructions 152-1 by processing thread 150-1. In this latter case, the monitor function will not suspend processing thread 150-1. When there is no suspension, processing thread 150-1 will commit any object modifications to memory by modifying appropriate portions of the object 171-1 in heap 161.

In this way, each of the processing threads 150 can execute sequences of instructions and conditionally store corresponding results in memory (e.g., heap 161) depending on whether the garbage collector 190 concurrently initiates copy operations associated with the objects 171 stored in memory system 160.

Note that the COMMIT instruction (e.g., instruction (vi) in Table I) causes a processing thread (e.g., mutator) to exit transactional mode. If the COMMIT operation is successful, any STORE operation performed during transactional mode will be made visible to other processors in the multi-processing environment 101.

A critical property provided by hardware transactional memory is that stores (e.g., writing memory to an object in the heap) are deferred and thus contingent upon a successful commit. If a transaction involving a store is killed (e.g., made to abort) by a concurrent copy operation that modifies the reference field, that store is annulled as a result.

FIG. 2 is an example block diagram of the multi-processing environment 101 that illustrates interaction between processing threads 150 (e.g., processing threads 150-1, 150-2, . . . 150-K) and objects stored in memory according to embodiments herein.

Generally, FIG. 2 depicts a scenario where processing thread 150-1 accesses data 181-1 of object 171-1 (as shown in FIG. 1) and, during such interaction, garbage collector 190 initiates copying or moving of object 171-1 to a new location in the heap 161 in this example embodiment as discussed above.

During a copy/move operation, garbage collector copies object 171-1 and associated data 181-1 to the new location in the heap 161 which is represented by object 171-2 and associated data 181-2. Note that object 171-2 and associated data 181-2 are shown as perforated lines to indicate that object 171 is in a transitional state while being copied by garbage collector 190.

To notify the multi-processing environment 101 that object 171-1 and associated data 181-1 are being copied/moved to a new location in heap 161, garbage collector 190 changes reference field 175 to one of a set of pre-specified values to indicate that object 171-1 is in a busy state. Thus, as shown in FIG. 2, reference field 175 is set to "BUSY".

In response to detecting that reference field 175 has been changed to "BUSY", monitor function 165, as part of the transactional logic 163 functionality, aborts the current interaction (e.g., aborts processing of the Checkpoint instruction as shown in Table I) between processing thread 150-1 and object 171-1 and returns to the initial operations of instructions 152-1 (e.g., instruction (i) in Table I). For example, if processing thread 150-1 were performing any of instructions (iv) through (vii) in Table I, monitor function 165 would abort such processing and return to instruction (i).

In one example embodiment, monitor function 165 aborts the current interaction between processing thread 150-1 and object 171-1 by performing abort step 191 with respect to processing thread 150-1 as previously discussed. Accordingly, processing thread 150-1 discontinues accessing data from and/or storing data to object 171-1 and, consequently, waits until the garbage collector 190 has completed copying object 171-1 to its new location in the heap 161 before restarting the previously-aborted instructions.

It should be noted that the transactional logic 163 automatically monitors respective reference fields associated with objects in the heap 161 to detect if and when the garbage collector 190 initiates copying of an object that is being accessed by a processing thread. Such a hardware fail-safe provided by the transactional logic 163 enables a garbage collector(s) (e.g., copying collector) to concurrently move and copy objects in memory while processing threads access those objects that are not being moved or copied by the garbage collector(s). By causing a processing thread to abort current interaction (e.g., load/read, store/write) with respect to an object being copied, the integrity of the data associated with that object is preserved such that the processing thread will not read erroneous data and/or store data to a location in memory where an object no longer exists. As a trade-off, the processing thread can resume interaction with the object as soon as the object has been successfully copied to its new location.

Referring now to FIG. 3, an example block diagram is shown of the multi-processing environment 101 illustrating interaction between processing threads 150 (e.g., processing threads 150-1, 150-2, . . . 150-K) and objects stored in memory according to embodiments herein.

In furtherance of the example configuration shown in FIG. 2, FIG. 3 depicts a scenario where garbage collector 190 has completed copying or moving object 171 from its previous memory location as object 171-1 to the new memory location as object 171-2. After completing the copy operation of object 171, garbage collector 190 changes reference field 175 from the "BUSY" value to a new respective pointer value (e.g., POINTER_1 is overwritten with the value PTR_4) referencing the object 171 in its new location as 171-2. Note that newly generated reference field 178 associated with object 171 is set to PTR_4 and points to object 171-2 at its new location in the heap 161 rather than the old location.

If, for example, monitor function 165 had caused processing thread 150-1 to abort any processing with respect to object 171-1 (as discussed for FIGS. 1 and 2), processing thread 150-1 could now resume interaction with object 171-2 since object 171 has been successfully copied to the new memory location in heap 161. More specifically, upon determining that reference field 175 has changed from a "BUSY" value to the new pointer value "PTR_4" (e.g., instructions (i) and (ii) of Table I), processing thread 150-1 resumes interaction with the object in its new location rather than the old one. Thus, because the object is no longer in a "BUSY" state, processing thread 150-1 can perform load and/or store operations with respect to data 181-2 associated with object 171-2.

Fallback Mode: When Mutator Transactional Barriers Fail to Make Progress

Some processors that support hardware transactional memory may not guarantee progress for all transactions. That is, even in the absence of any remote interference (obstruction) a given transaction may fail and, consequently, all retries of the same transaction will fail indefinitely without any progress. Thus, in the event of a failed transaction, embodiments herein provide a fallback to other mechanisms in order to ensure progress.

For example, one scenario involves hardware transaction-based write barriers that fail repeatedly. The code executed to coordinate an application's update to an object is called a write barrier. In such circumstances, a protocol is reverted to where the mutator thread indicates that a write transaction is in-progress by storing a distinguished "write in progress" encoding into the forwarding pointer. Specifically, the write barrier would, i) store the "write in progress" encoding into the forwarding pointer; ii) perform the write operations; and, iii) clear the "write in progress" indication. Concurrent copy operations can check the forwarding pointer and defer copying an object while such writes are in-progress. Likewise, write barriers can defer writing if a copy operation is in-progress. In other words, mutator threads can check and respect the BUSY encoding set by copying threads, and copying threads can check and respect the "write in progress" indication set by the mutator threads; thus avoiding undesirable copy-vs-write races. Typically, both the writer barrier and the copy operation can access the forwarding pointer with a single-word atomic instruction such as Compare-And-Swap "CAS" to avoid undesirable races.

Also note that, in one example embodiment, the execution of multiple concurrent write threads is enabled by encoding a "WRITERCOUNT" in the forwarding pointer. Moreover, note the analogy to read-write locks: in this case the copying thread has the role of the read-write lock writer and the mutator threads have the role of read-write lock readers, even though those threads may be writing into the object.

Of course, the CAS operations are typically expensive and can induce considerable local latency. Therefore, embodiments herein are preferably configured to avoid interference between mutator write barriers and copy operations through the use of hardware transactions, reverting to CAS only as a fall-back when a transactional barrier suffers from progress failure.

In using some processors that support hardware transactional memory, it is likely that longer hardware transactions may be more vulnerable to indefinite progress failure. As such, the JIT or compiler that decomposes logical field stores (at the source level or bytecode level) into machine write barriers might use its knowledge of the particular hardware capabilities of the hardware transactional memory subsystem to select an optimal number of stores to place within each hardware transaction. Furthermore, a managed runtime environment such as Java Virtual Machine (JVM) could track failure rates by write barrier site or other grouping and automatically recompile certain write barriers to include fewer stores. Such implementations would slightly increase the overhead of write barriers but, at the same time, also increase the odds of successfully executing a transaction. As needed, the JIT or compiler is free to move other program logic (e.g., beyond just loads and stores) into a transaction.

For example, consider a simplified scenario where a "WRITING" bit is added to the forwarding pointer. Commonly, the WRITING bit would occupy the least-significant bit. Typically, the encoding for the forwarding pointer field would allow code to efficiently distinguish the WRITING, BUSY and the normal states. Sample pseudo-code describing utilization of the WRITING bit in such a scenario is shown in Table III:

TABLE III

```
// Mutator Write barrier
// store ra into obj->FieldA and rb into obj->FieldB
// ----------------------------------------------------
    WriteBarrier:
    CHKPT FallBackPath    // enter transactional mode
    LD Obj->fwd, f
    test f
    if BUSY or (WRITING bit is set)
        abort the transaction, restart at WriteBarrier
    // The programmer or automatic compiler can fold multiple
    memory reference
    // operations into a single transaction to amortize the cost of
    CHKPT-COMMIT
    // As needed, the compiler is also free to move other program
    logic -- beyond
    // just loads and stores -- into a transaction.
    ST ra, f->FieldA      // transactional store
    ST rb, f->FieldB      // transactional store
    COMMIT                // exit transactional mode
    jmp Done
FallBackPath:
    LD Obj->fwd, f
    test f
    if (WRITING bit is set in f) or (f is BUSY)
        // Some other thread is concurrently writing to the object
        // or the collector happens to be copying this object.
        // Respect the protocol and defer until the conflicting copy completes.
        // spin (e.g., after optional delay), waiting for the condition to clear
        jmp FallBackPath
    // f is in normal state
    // atomically try to set the WRITING bit
    // The CAS ratifies that f remained unchanged.
    tmp =CAS (&obj->Fwd, f, f-WRITING)
    if (tmp != f)
        // interference -- obj->Fwd changed -- just retry
        jmp FallBackPath
    ST ra, f->FieldA     // normal store
    ST rb, f->FieldB     // normal store
    ST tmp, f->fwd       // clear WRITING bit
Done:
```

In the example of Table III, the protocol artificially permits access for just one write thread at any given time. This restriction arises from the fact that there is but a single writer bit (e.g., WRITING). In practice, if the system rarely falls back to the CAS-based exclusion protocol then performance will not be substantially penalized. On the other hand, if the system falls-back frequently, then a more sophisticated model can be implemented where the WRITER bit is replaced with a WRITERCOUNT field, thus allowing multiple concurrent writer threads. Since writing threads are mutually exclusive with copying threads, and mutator threads only store into the current (newest) version of a given object (e.g., where the Obj→Fwd forwarding pointer points back to Obj), then the WRITERCOUNT field can be encoded in the bits normally used to hold the self-referential forwarding pointer along with a low-order "tag" bit to discriminate the encoding from BUSY or normal. When the WRITERCOUNT drops to 0, the forwarding pointer is restored to point back to the object itself. That is, when the WRITERCOUNT is non-zero, the forwarding pointer implicitly points back to the object itself, as is the normal case for the most recent copy of an object that is not in the process of being copied.

Note, too, that locking and forwarding pointers can be decoupled. In table III, the forwarding pointer (e.g., reference field) is used both for locking and for forwarding. Variously, one embodiment may employ per-page locks instead of per-object locks as shown in the example in table III.

It should be noted that if the hardware supports DCAS (Double-CAS), the write barriers can be implemented in terms of DCAS instead of transactions, according to one embodiment. Such an implementation is based on the observation that DCAS is merely a degenerate form of a static transaction. DCAS is used instead of just CAS since one of the DCAS memory operations must "monitor" the forwarding pointer. The other operand can be used to store into the object.

It should also be pointed out that the standard per-object synchronization metadata (e.g., lock word) does not require special treatment with embodiments herein and can be treated the same way as other object data as previously described. However, persons skilled in the art will appreciate opportunities for optimization by combining functionality of the per-object synchronization metadata with the reference field introduced in this disclosure.

Software-Based Model

A software-based model according to embodiments herein enables a garbage collector 190 (e.g., copying collector) and one or more threads (e.g., processing threads 150, mutator threads, etc.) to concurrently execute instructions with respect to data in the same memory space. Unlike the hardware-assisted model, the software-based model does not rely on transactional memory to monitor the activity of the garbage collector. Instead, the instruction set generated by the compiler includes software safeguards for resolving any conflicts that can result from a processing thread and a garbage collector concurrently accessing the same object in shared memory.

It should be noted that embodiments representative of the software-based model are applicable only for fetch or load operations, and do not apply to store or write operations. The software-based model does not provide a framework for executing safe and reliable store/write operations. Recall, however, that the hardware-assisted model previously discussed provides a safe and efficient means for executing store operations via a hardware transaction. Most notably, the hardware-assisted model enables store operations to be performed "efficiently" by: i) avoiding the need for the mutator thread to lock each object before storing/writing in order to avoid interference between the mutator thread and the copying garbage collector thread; and ii) avoiding the need for using page protection techniques.

Now, referring again to embodiments directed to the software-based model, an example instruction set labeled "Retry" showing high-level operations performed by a processing thread is shown:

TABLE II

| Retry: | |
|---|---|
| (i) | LD Obj->fwd, f // fetch reference field |
| (ii) | test 'f' for BUSY encoding |
| | if BUSY |
| (iii) | goto Retry (e.g., Spin after optional delay) |
| (iv) | LD f->Field_A, Register_A |
| (v) | LD f->Field_B, Register_B |
| (vi) | LD Obj->fwd, Ratify // fetch reference field to ratify |
| (vii) | cmp Ratify, f |
| (viii) | bne Retry |
| | . . . |

Methods herein are presented assuming a sequentially consistent memory model. Persons skilled in the art will readily identify memory barrier or fence instructions required to apply such methods for weaker memory models.

Note that the "Retry" example instruction set of Table II does not necessarily require transactional logic functionality as previously described with regard to the example instruction set of Table I because the safeguard is encoded in the executed instructions instead of hardware.

It should be noted that the embodiments described with respect to the software-based model can coexist and interoperate properly with embodiments described for the hardware-assisted model.

Figure 4:
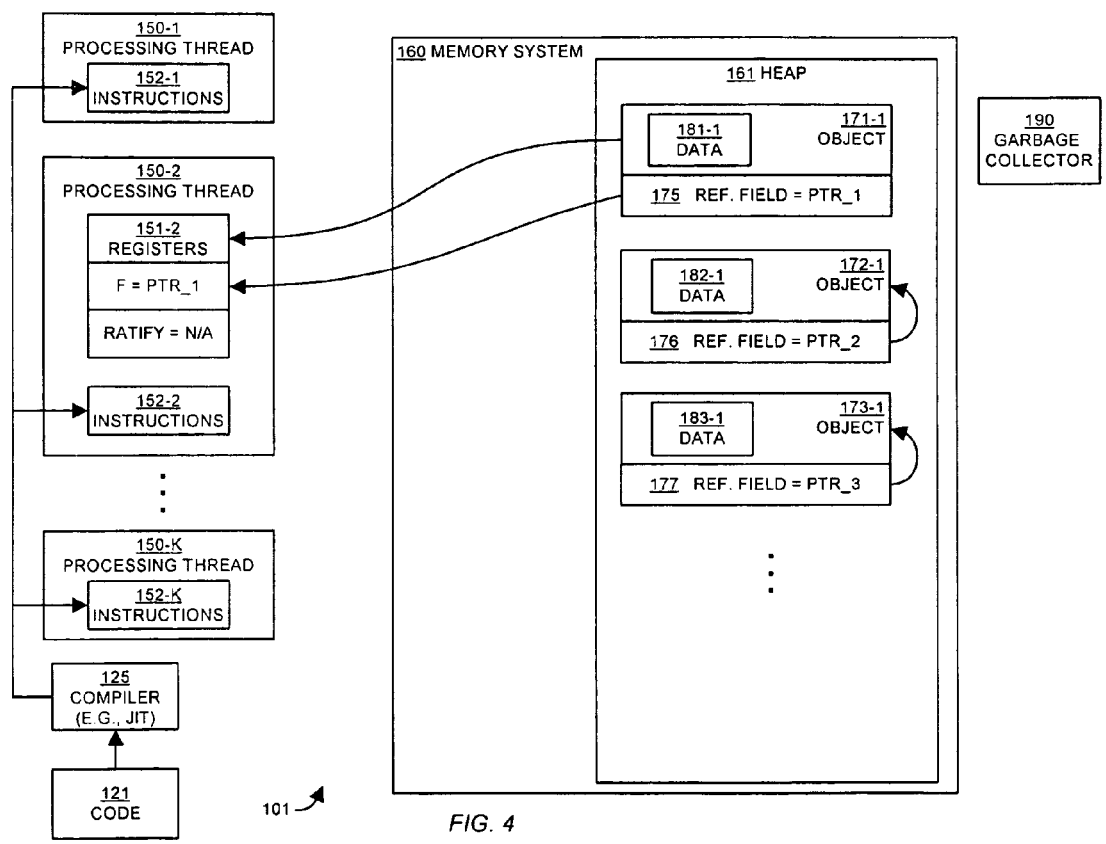
FIGS. 4-6 are example block diagrams of a memory system according to embodiments herein.
Figure 5:
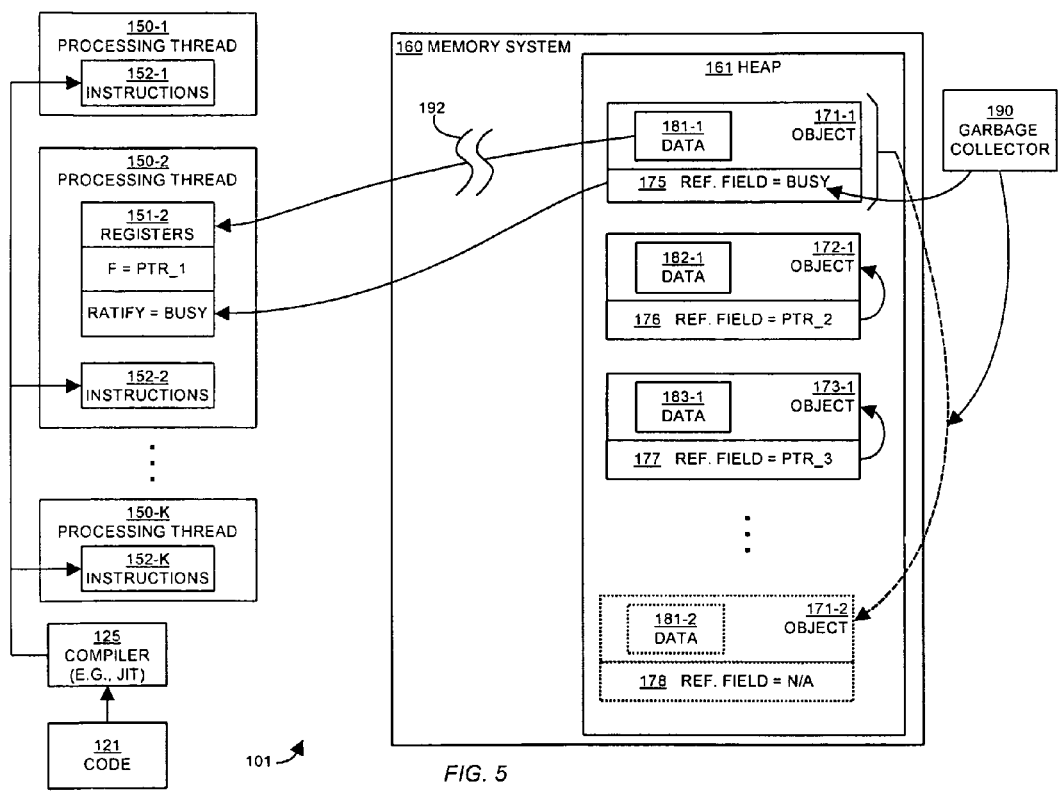
Figure 6:
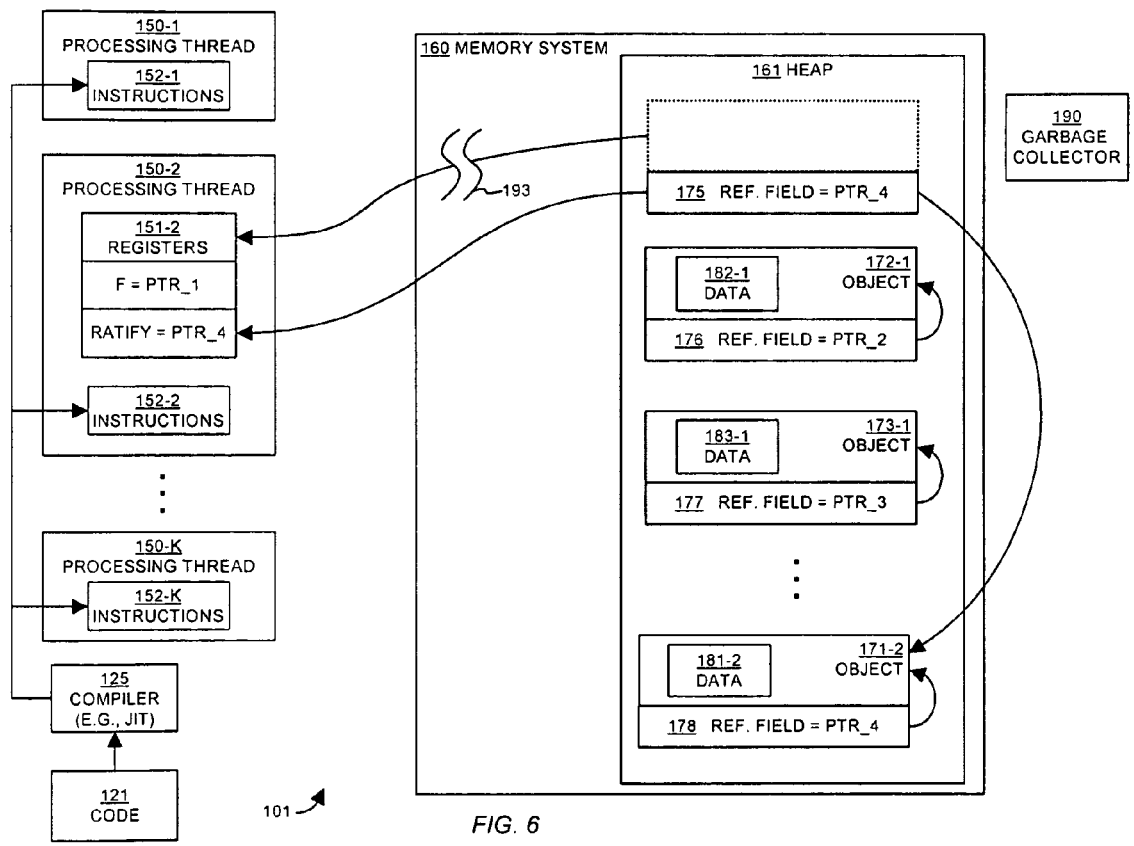

Now, more particularly, FIGS. 4-6 depict the implementation of the example instruction set of Table II in greater detail, as discussed further below. Recall that the embodiments shown in FIGS. 1-3 describe how the functionality of the transactional logic assists in determining whether a garbage collector initiates, or has already initiated copying of an object to a new location in memory. In contrast, FIGS. 4-6 describe embodiments wherein a processing thread makes such a determination without assistance from the transactional logic. More specifically, a processing thread can post-ratify that the observed values (e.g., obtained during a load or fetch operation) are correct and, consequently, consume those values that were fetched from the object.

It should be noted that, in reference to FIGS. 4-6, the garbage collector 190 still changes the reference field to a "BUSY" state when initiating a copy operation on an object. Likewise, garbage collector 190 changes the reference field from the busy state to point to the new location in memory upon completion of the copy operation. Further note that the embodiments depicted in FIGS. 4-6 represent read-only transactions, wherein a processing thread interacts with an object in the heap by performing only load or fetch operations (instead of store operations).

FIG. 4 depicts an example block diagram of a multi-processing environment 101 that illustrates interaction between processing threads 150 (e.g., processing threads 150-1, 150-2, ... 150-K) and objects stored in memory, according to embodiments herein.

When interacting (e.g., loading or fetching) data 181-1 associated with object 171-1, processing thread 150-2 first determines whether object 171-1 is in a "BUSY" state which indicates that the object is being copied or moved to a new memory location by garbage collector 190. To make this determination, processing thread 150-2 performs the following instructions (e.g., instructions 152-2) as noted in the example instruction set of Table II:

(i) LD Obj→fwd, f//fetch reference field
(ii) test 'f' for BUSY encoding
  if BUSY
(iii) goto Retry (e.g., Spin after optional delay)
  MEMBAR #loadload
(iv) LD f→Field_A, Register_A
(v) LD f→Field_B, Register_B During execution of instruction (i) from Table II, processing thread 150-2 loads reference field 175 (e.g., PTR_1 in FIG. 4 or "fwd" in Table II) into variable 'f' in associated registers 151-2, as shown in FIG. 4. Note that processing thread 150-2 can utilize any temporary on-chip processor memory to store reference field 175 as variable 'f'.

During execution of instruction (ii) from Table II, processing thread 150-2 determines whether reference field 175 has been set to a "BUSY" state by garbage collector 190. Recall that the busy state indicates that garbage collector 190 is copying object 171-1 to another memory location in heap 161. Similar to previously described instruction (ii) of Table I, processing thread 150-2 can compare the variable 'f' (now representing reference field 175) with a value representing "BUSY" to determine if object 171-1 is currently accessible without conflicts from the garbage collector 190.

During execution of instruction (iii) from Table II, if variable 'f', and thus reference field 175, equals a value representing "BUSY", processing thread 150-2 loops back and repeats instructions (i) and (ii). Stated differently, the busy state of object 171-1 causes processing thread 150-1 to spin (e.g., after optional delay) until reference field 175 is not equal to a value representing "BUSY" (or when reference field 175 contains a pointer to an object). Thus, processing thread 150-2 waits until garbage collector 190 has finished copying/moving object 171-1 to another memory location in heap 161 before resuming interaction with object 171-1.

During execution of instructions (iv) and (v) from Table II, if variable T, and thus reference field 175, does not equal a value representing "BUSY", processing thread 150-2 proceeds through the Retry routine by accessing (e.g., loading or fetching) data 181-1 in object 171-1 to carry out respective operations. For example, again assume that object 171-1 has a Field_A and a Field_B (e.g., data 181-1) and that registers 151-2 include a Register_A and a Register_B. As such, processing thread 150-2 can load the value from Field_A into Register_A (instruction (iv)) and load the value from Field_B into Register_B (instruction (v)). Field_A and Field_B of object 171-1 are accessible to processing thread 150-2 since reference field 175, and now variable 'f', is a pointer value referencing object 171-1 (e.g., PTR_1). Of course, the processing thread can perform instructions other than these sample instructions as well.

Prior to committing its results to memory, the processing thread 150-2 performs a ratify step to determine whether or not to abort a current set of instructions. For example, after performing the set of instructions 152-2, processing thread 150-2 obtains a current value of reference field 175 and compares the value to the initial value stored at the beginning of executing the thread. If the reference field is still equal to PTR-1 (e.g., the reference field has not changed), the results associated with execution of instructions 152-2 can be committed to memory unless there is a conflict with respect to the other threads that may also have been accessing and modifying object 171-1.

FIG. 5 is a diagram showing a continued example of a multi-processing environment 101 according to embodiments herein.

In general, FIG. 5 illustrates a scenario in which the garbage collector 190 initiates a copy operation on object 171-1 while processing thread 150-2 is currently interacting with object 171-1. Initially, the value of reference field 175 is PTR_1. The processing thread stores this value as T. After executing instruction set 152-2, the reference field 175 is set to BUSY. The processing thread stores this value as RATIFY. In such a scenario, because 'f' and RATIFY are not equivalent, processing thread 150-2 is able to recognize the garbage collector's activity with respect to object 171-1 and, upon this recognition, proceed in a manner as discussed above (e.g., abort and re-execute the instructions) so as not to access the object 171-1 while it is being accessed by the garbage collector 190.

Note that object 171-2 and associated data 181-2 represent the object 171 in its new memory location in the heap 161. The perforated lines signify that the object 171 is in a transitional state and that the garbage collector 190 has not yet completed copying object 171.

By ratifying in a manner as discussed above, processing thread 150-2 confirms that reference field 175 has not changed since the initial loading of reference field 175 in instruction (i) of Table II. If the reference field 175 has not changed since the initial load of instruction (i), processing thread 150-2 can assume that the garbage collector 190 has not copied/moved object 171-1 and that object 171-1 has remained in the same location in the heap 161 since execution of instruction (i).

The following example instructions from Table II illustrate how processing thread 150-2 ratifies a reference field:

(vi) LD Obj→fwd, Ratify//fetch reference field to ratify
(vii) cmp Ratify, f
(viii) bne Retry
(ix) nop
. . .

During execution of instruction (vi) from Table II, processing thread 150-2 loads the reference field 175 into variable "Ratify" in associated registers 151-2, as shown in the example embodiment of FIG. 5. Note that processing thread 150-2 can utilize any temporary on-chip processor memory to store reference field 175 as variable Ratify.

During execution of instruction (vii) from Table II, processing thread 150-2 compares (e.g., via the "cmp" instruction) the newly acquired reference field 175 "Ratify" (obtained in instruction (vi)) with the initially acquired reference field 175 (obtained in instruction (i)).

Note that example embodiment of FIG. 5 shows that the initial reference field 175 stored in 'f' is a pointer value referencing object 171-1 (e.g., PTR_1). Further note that the reference field 175 stored in Ratify is a value representing "BUSY" (e.g., object 171-1 is in a busy state).

During execution of instruction (viii) from Table II, if the Ratify value is not equal to the 'f' value, then processing thread 150-2 returns (e.g., loops back) to instruction (i). This causes an abort and retry. Such processing is carried out by the branch if not equal "bne" instruction shown in Table II.

As shown in the example embodiment of FIG. 5, since the Ratify value is "BUSY", processing thread suspends its current interaction with object 171-1 (shown by suspension marker 192), returns to instruction (i), and spins (e.g., after optional delay) until object 171-1 is no longer in a busy state.

FIG. 6 shows an example block diagram of a multi-processing environment 101 illustrating a condition in which the value of reference field of reference field 175 is initially PTR_1 but is changed to PTR_4 during execution of instructions 151-1 according to embodiments herein.

In FIG. 6, the garbage collector 190 completes a copy/move of object 171-1 to a new memory location in heap 161 while processing thread 150-2 is accessing data 181-1 of object 171-1. It should be noted that object 171 and associated memory 181 are now represented in their new memory location by object 171-2 and associated data 181-2, respectively. Further note that reference field 175 has been updated to point to the new location in memory to where object 171 has been copied (e.g., PTR_4).

Recall that during execution of instruction (viii) from Table II, if the Ratify value is not equal to the 'f' value, then processing thread 150-2 returns (e.g., loops back) to instruction (i). Since, as shown in FIG. 6, the Ratify value is now a pointer referencing object 171-2 and its new location in memory to where it has been copied (e.g., PTR_4), and the 'f' value is the pointer to object 171-1 at referencing its initial location in memory (e.g., PTR_1), the Ratify value is not equal to the 'f' value. In one embodiment, based on execution of instruction (viii) from Table II, processing thread 150-2 suspends further accesses to object 171-1 (as shown by suspension marker 193) and returns to execution of instruction (i) as previously discussed.

Figure 7:
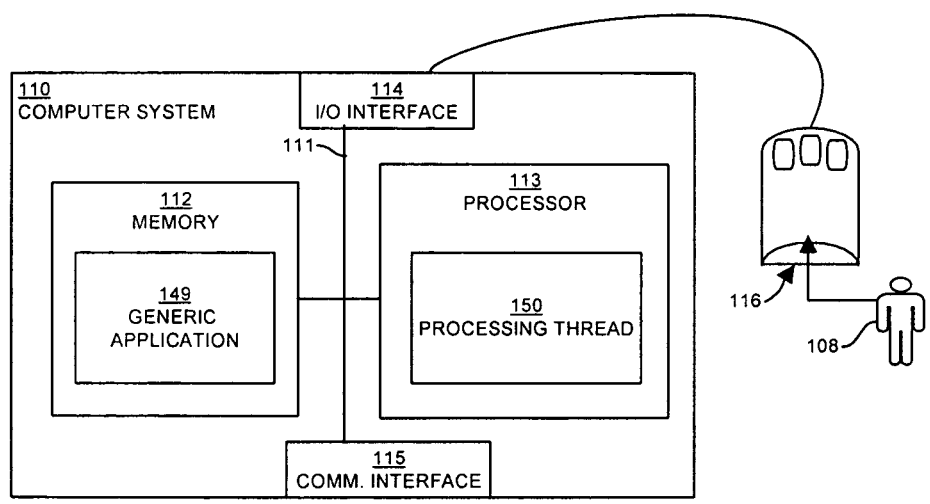
FIG. 7 is an example block diagram of a computer system configured with a generic application and a processing thread according to embodiments herein.

FIG. 7 is a block diagram illustrating example architecture of a computer system 110 that executes, runs, interprets, operates or otherwise performs a generic application 149 and/or processing thread 150 according to embodiments herein. The computer system 110 may be any type of computerized device such as a personal computer, workstation, portable computing device, console, laptop, network terminal, client, etc.

As shown in the example of FIG. 7, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 to provide input commands. The communications interface 115 enables the computer system 110 to communicate with other devices.

The memory system 112 can generally be any type of computer readable media (e.g., tangible computer readable media) encoded with a generic application 149. The generic application 149 may be embodied as software code (e.g., code 121), such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions of the generic application 149. Execution of generic application 149 in this manner produces processing functionality in one or more processing threads (e.g., processing threads 150-1, 150-2 . . . 150-k). In other words, processing thread 150 represents one or more portions of runtime instances of the generic application 149 performing or executing within or upon the processor 113 in the computerized device 110 at runtime.

FIGS. 8-11 include flowcharts according to embodiments herein. Each step denotes one or more computer software instructions or groups of instructions or hardware logic that carry out such functionality. The flow diagrams do not necessarily depict the syntax of any particular programming language. Rather, the flow diagrams illustrate the functional information one of ordinary skill in the art could use to fabricate hardware circuits and/or to generate computer software (or a hybrid of both hardware circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 8:
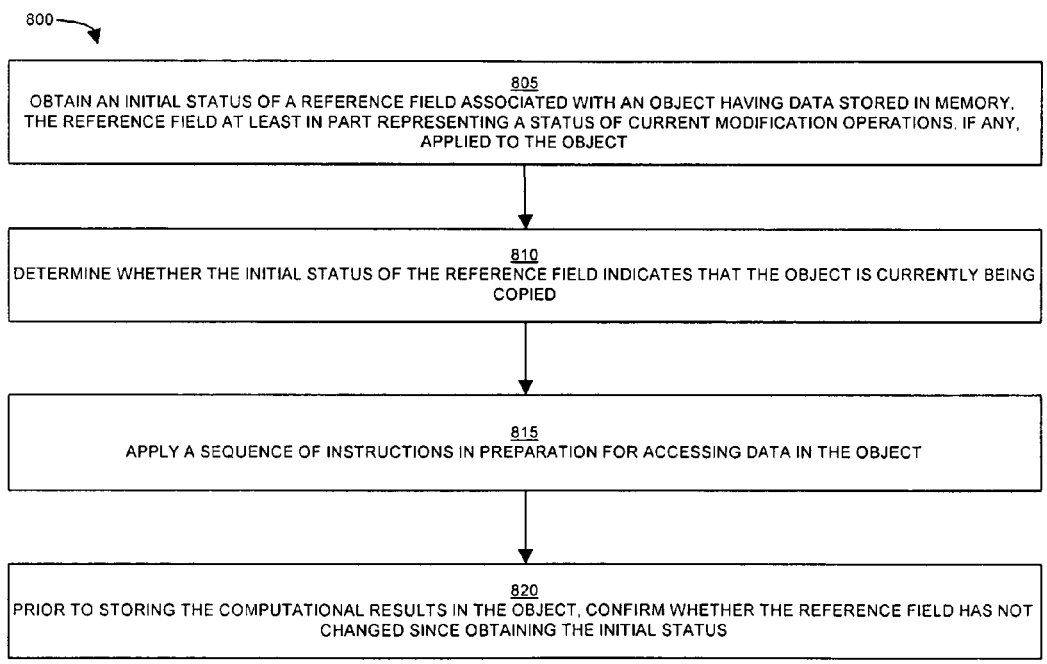
FIG. 8 is an example flowchart of processing steps associated with a processing thread executing concurrently with a garbage collector according to embodiments herein.

Now, more specifically, FIG. 8 is a flow chart 800 of processing steps that shows processing operations performed by a resource such as processing thread 150 in accordance with one example embodiment.

In step 805, processing thread 150 obtains an initial status of a reference field (e.g., forwarding pointer) associated with an object having data stored in memory. The reference field at least in part represents a status of current modification operations, if any, applied to the object. As discussed above, the reference field 175 can be a pointer value or set to a BUSY state. Thus, the reference field associated with the object provides a status associated with the object such as whether it is currently being copied by the garbage collector 190 to a new location or not.

Note that the pointer can reference a contiguous portion of memory that has been allocated for storage of the new copy of the object rather than being associated with an object. In other words, the reference field (e.g., forwarding pointer) can be maintained on a per-segment basis in addition to, or in lieu of, the traditional per-object configuration.

According to an example embodiment, processing thread 150 receives a status indicating that the object is in a BUSY state in which a garbage collection process copies the object to a new location in memory. In this manner, the BUSY state indicates restricted access to data associated with the object. In response to receiving the status indicating that the object is in a busy state, processing thread 150 continually re-obtains the initial status of the reference field until the status indicates a pointer to the object in memory (e.g., processing thread 150 spins until the object is no longer in a BUSY state).

If the design of the garbage collector 190 allows for multiple garbage collection threads (e.g., multiple garbage collectors 190) to complete a copy to a new location, the copying garbage collection threads can use an atomic compare-and-swap (CAS) (instead of storing a "BUSY" value to an object's reference field) in order to claim the right to that object. A compare-and-swap to a location that is in another processing thread's read-set suspends that thread's transaction in a similar fashion as does storing a "BUSY" value to the object being copied.

In step 810, processing thread 150 determines whether the initial status of the reference field indicates that the object is currently being copied.

In step 815, the processing thread 150 applies a sequence of instructions in preparation for accessing data in the object.

In step 820, prior to storing the computational results in the object, processing thread 150 confirms whether the reference field has not changed since obtaining the intial status.

Figure 9:
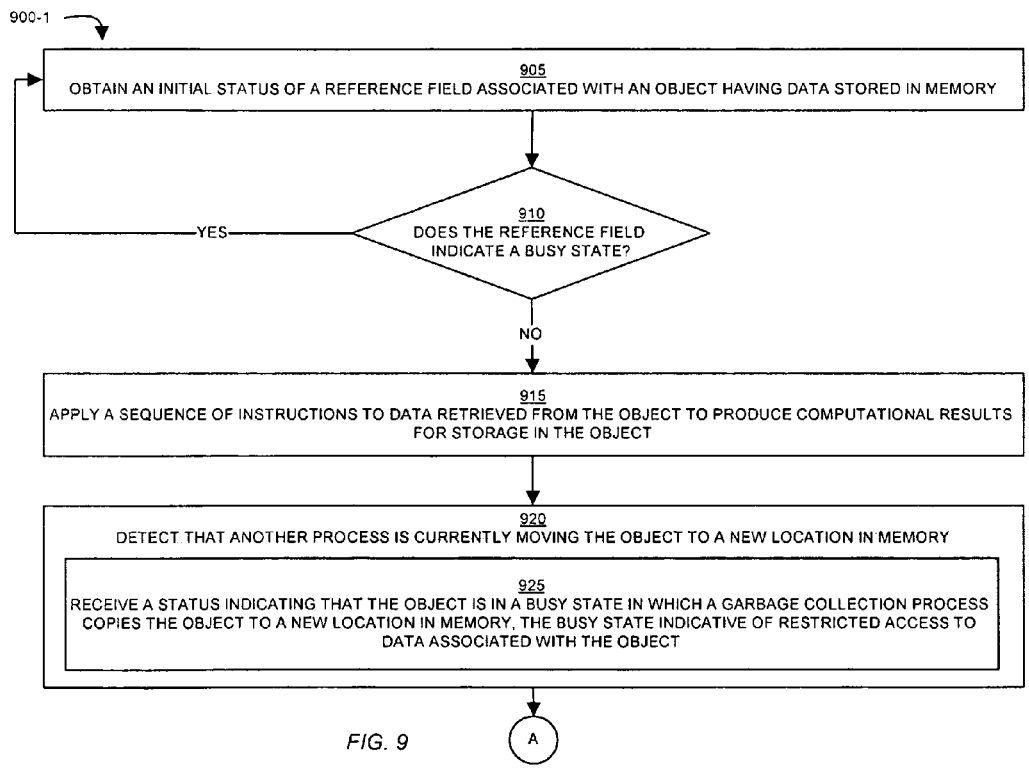
FIGS. 9 and 10 combine to form an example flowchart of processing steps associated with a processing thread executing concurrently with a garbage collector according to embodiments herein.
Figure 10:
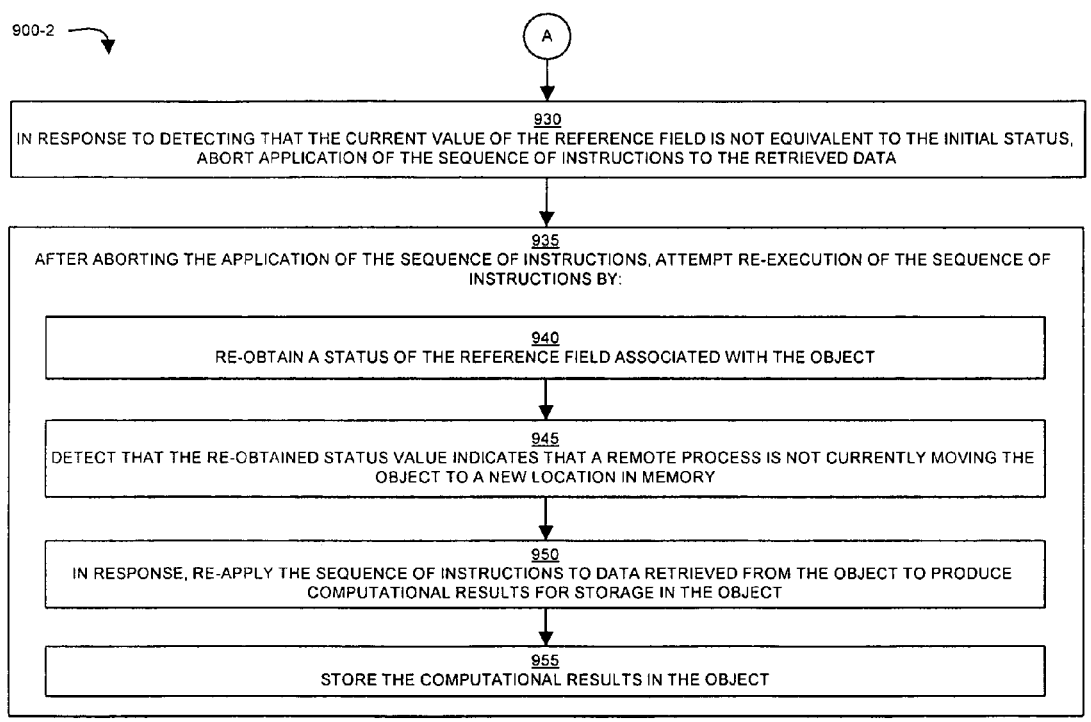

FIGS. 9 and 10 combine to form a flow chart 900 (e.g., flowchart 900-1 and flowchart 900-2) of processing steps that shows processing operations performed by the processing thread 150 in accordance with one example embodiment. In this example, the processing thread executing the steps relies on an external resource or resources such as transactional logic 163 or monitor function 165 to suspend the processing thread if a currently accessed object happens to be moved by the garbage collector 190 while in the middle of executing a respective set of instructions.

In step 905, processing thread 150 obtains an initial status of a reference field associated with an object having data stored in memory.

In step 910, processing thread 150 determines whether the reference field indicates that the object is in a BUSY state. If it is determined that the object is in a BUSY state based on processing by the garbage collector 190, processing thread 150-2 returns to step 905 and spins until the BUSY state ends. Otherwise, processing thread 150 continues to step 915.

In step 915, processing thread 150 applies a sequence of instructions to data retrieved from the object to produce computational results for storage in the object. These values are temporarily stored prior to being committed to memory.

In step 920, processing thread 150 detects that another process is currently moving the object to a new location in memory. According to one example embodiment, receipt of the signal by processing thread 150 temporarily prevents application of the sequence of instructions to the data in the object until the reference field indicates completion of the copy to the new location.

In step 925, processing thread 150 receives a status indicating that the object is in a busy state in which a garbage collection process copies the object to a new location in memory. The busy state indicates restricted access to data associated with the object.

In step 930 of FIG. 10, and in response to detecting that the current value of the reference field is not equivalent to the initial status, processing thread 150 aborts application of the sequence of instructions to the retrieved data.

In step 935, after aborting the application of the sequence of instructions, processing thread 150 attempts re-execution of the sequence of instructions by performing steps 940 through 955.

In step 940, processing thread 150 re-obtains a status of the reference field associated with the object.

In step 945, processing thread 150 detects that the re-obtained status value indicates that a remote process (e.g., garbage collector) is not currently moving the object to a new location in memory.

In step 950, in response to detecting that the re-obtained status value indicates that a remote process is not currently moving the object to a new location in memory, processing thread 150 re-applies the sequence of instructions to data retrieved from the object to produce computational results for storage in the object.

In step 955, processing thread 150 stores the computational results in the object.

Figure 11:
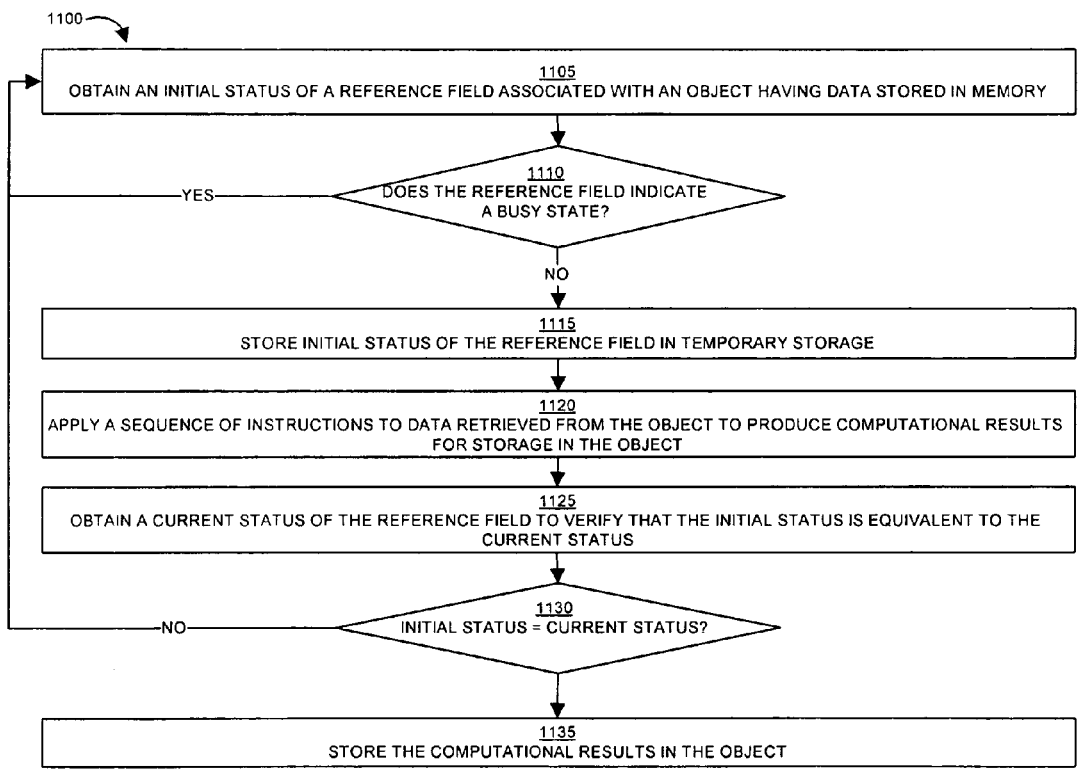
FIG. 11 is an example flowchart of processing steps associated with a processing thread executing concurrently with a garbage collector according to embodiments herein.

FIG. 11 is a flow chart 1100 of processing steps that shows processing operations performed by processing thread 150 in accordance with one example embodiment. In this example, the processing thread executing the following steps does not rely on an external resource such as transactional logic 163 or monitor function 165 to suspend the processing thread if a currently accessed object happens to be moved by the garbage collector. Instead, the instructions executed by the processing thread enable the processing thread to monitor a status of the object and whether it is subject to being moved by the garbage collector 190. Note that such embodiments are only applicable to fetch or load operations, and do not apply to store or write operations for reasons previously described.

In step 1105, processing thread 150 obtains an initial status (e.g., VAR) of a reference field associated with an object having data stored in memory.

In step 1110, processing thread 150 determines whether the reference field indicates that the object is in a busy state. If it is determined that the object is in a busy state, processing thread 150 returns to step 1105. Otherwise, processing thread 150 continues to step 1115.

In step 1115, processing thread 150 stores the initial status of the reference field in temporary storage.

In step 1120, processing thread 150 applies a sequence of instructions to data retrieved from the object to produce computational results for storage in the object.

In step 1125, processing thread 150 obtains a current status (e.g., Ratify) of the reference field to verify that the initial status is equivalent to the current status.

In step 1130, processing thread 150 determines if the initial status is equal to the current status. If it is determined that the initial status (e.g., VAR) is not equal to the current status (e.g., Ratify), then processing thread 150-2 returns to step 1105 to re-obtain a status of the reference field associated with the object. Otherwise, processing thread 150 proceeds to step 1135.

In step 1135, processing thread 150 stores the computational results in the object.

According to one example embodiment, processing thread 150 obtains a pointer to a location in the memory where a new copy of the object is stored. Based on a change in the reference field since obtaining the initial status, processing thread 150 retrieves a current value of the reference field. The processing thread 150 can then utilize the current reference field to identify a new location in memory where the object has been stored since obtaining the initial status of the reference field. As a result, processing thread 150 stores the computational results in the object stored in the new location in memory.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What is claimed is:

1. A method comprising:
    executing a garbage collection process to perform garbage collection on objects in a memory, the garbage collection process executing concurrent to processing threads that access the memory;
    obtaining an initial status of a reference field associated with an object stored in the memory, the object comprising an object header and object data, the object header including the reference field, the reference field indicating a busy state when the garbage collection process is copying the object and a location in the memory when the garbage collection process is not copying the object;
    determining whether the initial status of the reference field indicates the busy state;
    executing one of the processing threads to apply a sequence of instructions to object data retrieved from the object to produce computational results;
    prior to committing the computational results for storage in the object, determining whether a current value of the reference field has been changed by the garbage collection process since obtaining the initial status, the reference field being changed to indicate the busy state;
    determining that the initial status of the reference field has been changed to indicate the busy state; and
    in response to determining that the initial status of the reference field has been changed to indicate the busy state, suspending the one of the processing threads such that the one of the processing threads does not store the computational results, and allowing all other of the processing threads that are not accessing the object or another object having a reference field changed to indicate the busy state to continue executing.

2. A method as in claim 1, further comprising committing the computational results for storage in the object if the current value of the reference field has not changed since obtaining the initial status.

3. A method as in claim 2, wherein obtaining the initial status value includes:
    detecting that the reference field indicates that the object is currently being copied from one location to a new location in the memory; and
    in response to the detecting, temporarily preventing application of the sequence of instructions until the reference field indicates completion of the copy to the new location.

4. A method as in claim 1, wherein determining whether the current value has changed includes detecting whether the garbage collection process is currently moving the object to a new location in the memory.

5. A method as in claim 4, further comprising:
    detecting that the current value of the reference field has changed from the initial status of the reference field; and
    aborting application of the sequence of instructions in response to detecting that the current value of the reference field has changed.

6. A method as in claim 5 further comprising:
    after aborting the application of the sequence of instructions, attempting re-execution of the sequence of instructions by:
        re-obtaining a status of the reference field associated with the object;
        in response to detecting that the re-obtained status value indicates that the garbage collection process is not currently moving the object to a new location in the memory, re-applying the sequence of instructions to object data retrieved from the object to produce computational results for storage in the object; and
        storing the computational results in the object.

7. A method as in claim 1, further comprising:
    determining that the initial status of the reference field is not equivalent to the current value, the initial status value being changed to the current value by the garbage collection process; and
    attempting re-execution of the sequence of instructions by:
        re-obtaining a status of the reference field associated with the object;
        in response to detecting that the re-obtained status value indicates that the garbage collection process is not currently moving the object to a new location in the memory, re-applying the sequence of instructions to object data retrieved from the object to produce computational results for storage in the object;
        determining whether the re-obtained status of the reference field is equivalent to a re-obtained current status of the reference field; and
        storing the computational results in the object if the re-obtained status of the reference field is equivalent to the re-obtained current status of the reference field.

8. A method as in claim 7, wherein determining whether the re-obtained status of the reference field is equivalent to the re-obtained current status includes detecting a change with respect to the reference field indicating that the object is being copied to a new memory location by a garbage collection process.

9. A method as in claim 1 further comprising:
    retrieving a current value of the reference field;
    utilizing the current value of the reference field to identify a new location in the memory where the object has been stored since obtaining the initial status of the reference field; and
    storing the computational results in the object stored in the new location in the memory.

10. A method as in claim 1, wherein obtaining the initial status of the reference field associated with the object includes:
    obtaining a pointer to a location in the memory where the object is stored.

11. A method as in claim 1, wherein determining whether a current value of the reference field has changed since obtaining the initial status comprises:
    obtaining a pointer to a location in the memory where a new copy of the object is stored.

12. A method as in claim 1, wherein obtaining the initial status of a reference field associated with an object includes receiving a status indicating that the object is in a busy state in which the garbage collection process copies the object to a new location in the memory, the busy state indicative of restricted access to data associated with the object.

13. A method as in claim 12 further comprising:
in response to receiving the status indicating that the object is in a busy state, repeatedly re-obtaining the initial status of the reference field until the status indicates a pointer to the object in the memory.

14. A method as in claim 1, wherein the application of the sequence of instructions is performed by transactional memory logic during a memory transaction.

15. A method as in claim 14 further comprising:
detecting a failed memory transaction; and
receiving a locked status of the reference field associated with the object in response to detecting the failed memory transaction, the locked status indicative of at least one write operation that is currently in progress on the object, wherein the locked status restricts access to data associated with the object.

16. A method as in claim 1, wherein the obtaining, determining, applying and determining are executed by transactional memory logic during a memory transaction with respect to the object.

17. A computer system comprising:
a processor;
a memory unit that stores instructions associated with an application executed by the processor; and
an interconnect coupling the processor and the memory unit, enabling the computer system to execute the application and perform operations of:
executing a garbage collection process to perform garbage collection on objects in a memory, the garbage collection process executing concurrent to processing threads that access the memory;
obtaining an initial status of a reference field associated with an object stored in the memory, the object comprising an object header and object data, the object header including the reference field, the reference field indicating a busy state when the garbage collection process is copying the object and a location in the memory when the garbage collection process is not copying the object;
determining whether the initial status of the reference field indicates the busy state;
executing one of the processing threads to apply a sequence of instructions to object data retrieved from the object to produce computational results;
prior to committing the computational results for storage in the object, determining whether a current value of the reference field has been changed by the garbage collection process since obtaining the initial status, the reference field being changed to indicate the busy state;
determining that the initial status of the reference field has been changed to indicate the busy state; and
in response to determining that the initial status of the reference field has been changed to indicate the busy state, suspending the one of the processing threads such that the one of the processing threads does not store the computational results, and allowing all other of the processing threads that are not accessing the object or another object having a reference field changed to indicate the busy state to continue executing.

18. A computer system as in claim 17, wherein obtaining the initial status value includes:
detecting that the reference field indicates that the object is currently being copied from one location to a new location in the memory; and
in response to the detecting, temporarily preventing application of the sequence of instructions to the data in the object until the reference field indicates completion of the copy to the new location.

19. A computer system as in claim 17, wherein determining whether a current value of the reference field has changed since obtaining the initial status includes detecting whether the garbage collection process is currently moving the object to a new location in the memory.

20. A non-transitory computer-readable medium having instructions stored thereon, the instructions, when executed by a processing device, enabling the processing device to perform operations of:
executing a garbage collection process to perform garbage collection on objects in a memory, the garbage collection process executing concurrent to processing threads that access the memory;
obtaining an initial status of a reference field associated with an object stored in the memory, the object comprising an object header and object data, the object header including the reference field, the reference field indicating a busy state when the garbage collection process is copying the object and a location in the memory when the garbage collection process is not copying the object;
determining whether the initial status of the reference field indicates the busy state;
executing one of the processing threads to applying a sequence of instructions to object data retrieved from the object to produce computational results;
prior to committing the computational results for storage in the object, determining whether a current value of the reference field has been changed by the garbage collection process since obtaining the initial status, the reference field being changed to indicate the busy state;
determining that the initial status of the reference field has been changed to indicate the busy state; and
in response to determining that the initial status of the reference field has been changed to indicate the busy state, suspending the one of the processing threads such that the one of the processing threads does not store the computational results, and allowing all other of the processing threads that are not accessing the object or another object having a reference field changed to indicate the busy state to continue executing.

21. A computer-readable medium as in claim 20, further storing instructions that, when executed by the processing device, enable the processing device to perform operations of committing the computational results for storage in the object if the current value of the reference field has not changed since obtaining the initial status.

22. A computer-readable medium as in claim 21, wherein obtaining the initial status value includes:
detecting that the reference field indicates that the object is currently being copied from one location to a new location in the memory; and
in response to the detecting, temporarily preventing application of the sequence of instructions until the reference field indicates completion of the copy to the new location.

23. A computer-readable medium as in claim 20, wherein determining whether the current value has changed includes detecting whether the garbage collection process is currently moving the object to a new location in the memory.

24. A computer-readable medium as in claim 23, further storing instructions that, when executed by the processing device, enable the processing device to perform operations of:
    detecting that the current value of the reference field has changed from the initial status of the reference field; and
    wherein conditionally storing the computational results includes aborting application of the sequence of instructions in response to detecting that the current value of the reference field has changed.

25. A computer-readable medium as in claim 24, further storing instructions that, when executed by the processing device, enable the processing device to perform operations of:
    after aborting the application of the sequence of instructions, attempting re-execution of the sequence of instructions by:
        re-obtaining a status of the reference field associated with the object;
        in response to detecting that the re-obtained status value indicates that the garbage collection process is not currently moving the object to a new location in the memory, re-applying the sequence of instructions to object data retrieved from the object to produce computational results for storage in the object; and
        storing the computational results in the object.

26. A computer-readable medium as in claim 20, further storing instructions that, when executed by the processing device, enable the processing device to perform operations of:
    determining that the initial status of the reference field is not equivalent to the current value, the initial status value being changed to the current status value by the garbage collection process; and
    attempting re-execution of the sequence of instructions by:
        re-obtaining a status of the reference field associated with the object;
        in response to detecting that the re-obtained status value indicates that the garbage collection process is not currently moving the object to a new location in the memory, re-applying the sequence of instructions to object data retrieved from the object to produce computational results for storage in the object;
        determining whether the re-obtained status of the reference field is equivalent to a re-obtained current status of the reference field; and
        storing the computational results in the object if the re-obtained status of the reference field is equivalent to the re-obtained current status of the reference field.

27. A computer-readable medium as in claim 26, wherein determining whether the re-obtained status of the reference field is equivalent to the re-obtained current status includes detecting a change with respect to the reference field indicating that the object is being copied to a new memory location by a garbage collection process.

28. A computer-readable medium as in claim 20, further storing instructions that, when executed by the processing device, enable the processing device to perform operations of:
    retrieving a current value of the reference field;
    utilizing the current value of the reference field to identify a new location in the memory where the object has been stored since obtaining the initial status of the reference field; and
    storing the computational results in the object stored in the new location in the memory.

29. A computer-readable medium as in claim 20, wherein obtaining the initial status of the reference field associated with the object includes:
    obtaining a pointer to a location in the memory where the object is stored.

30. A computer-readable medium as in claim 20, wherein determining whether a current value of the reference field has changed since obtaining the initial status comprises:
    obtaining a pointer to a location in the memory where a new copy of the object is stored.

31. A computer-readable medium as in claim 20, wherein obtaining the initial status of a reference field associated with an object includes receiving a status indicating that the object is in a busy state in which the garbage collection process copies the object to a new location in the memory, the busy state indicative of restricted access to data associated with the object.

32. A computer-readable medium as in claim 31, further storing instructions that, when executed by the processing device, enable the processing device to perform operations of:
    in response to receiving the status indicating that the object is in a busy state, repeatedly re-obtaining the initial status of the reference field until the status indicates a pointer to the object in the memory.

33. A computer-readable medium as in claim 20, wherein the application of the sequence of instructions is performed by transactional memory logic during a memory transaction.

34. A computer-readable medium as in claim 33, further storing instructions that, when executed by the processing device, enable the processing device to perform operations of:
    detecting a failed memory transaction; and
    receiving a locked status of the reference field associated with the object in response to detecting the failed memory transaction, the locked status indicative of at least one write operation that is currently in progress on the object, wherein the locked status restricts access to data associated with the object.

35. A computer-readable medium as in claim 20, wherein the obtaining, determining, applying and determining are executed by transactional memory logic during a memory transaction with respect to the object.

\* \* \* \* \*